April 9, 1946.  T. J. VAN ALSTYNE  2,398,060

DISH HOLDER

Filed Oct. 31, 1944

INVENTOR
T. J. Van Alstyne
BY E. B. Birkenbeul
ATTORNEY.

UNITED STATES PATENT OFFICE 2,398,060

DISH HOLDER

Thomas J. Van Alstyne, Portland, Oreg.

Application October 31, 1944, Serial No. 561,296

1 Claim. (Cl. 65—54)

This invention relates generally to utensils and particularly to a dish holder.

The main object of this invention is to provide a holder for children's dishes, particularly adapted for holding them on a table or the tray of a high chair, and prevent same from being overturned or moved about.

I accomplish this object in the manner set forth in the following specification as illustrated in the accompanying drawing in which.

Similar numerals refer to similar parts throughout the several views.

Figure 1:
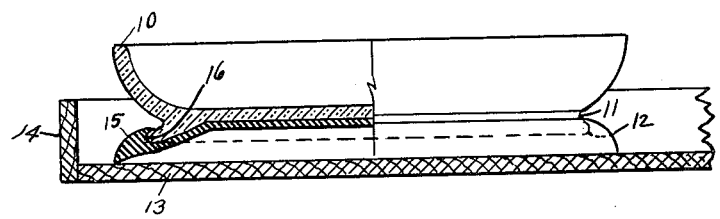
Fig. 1 is a partial vertical section through one form of the device.

Referring in detail to the drawing, there is shown in Fig. 1 a common form of child's dish 10 having the groove 11 formed above the base 12. The base 12 normally rests upon the tray 13 which is usually provided with an upturned edge 14.

In this form of the device, my invention consists of a rubber suction cup 15 and a groove 16 adapted to receive the base 12 of the dish 10. In this form of the device it is only necessary to apply the cup 15 to the dish and when placing it before the child press down upon same in a manner to expend the air from the interior of the cup 15 thereby affording a means for holding the cup in place after the pressure is removed therefrom.

Figure 2:
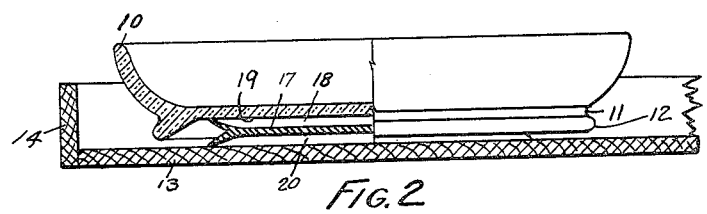
Fig. 2 is a similar view through a modified form of the device.

In Fig. 2 the same dish 10 is illustrated but there is provided a double cup member 17 whose top side 18 engages the underside 19 of the dish 10 and whose underside 20 engages the tray 13. This type of the device has the advantage of requiring less rubber in its construction and fitting any type of utensil.

Figure 3:
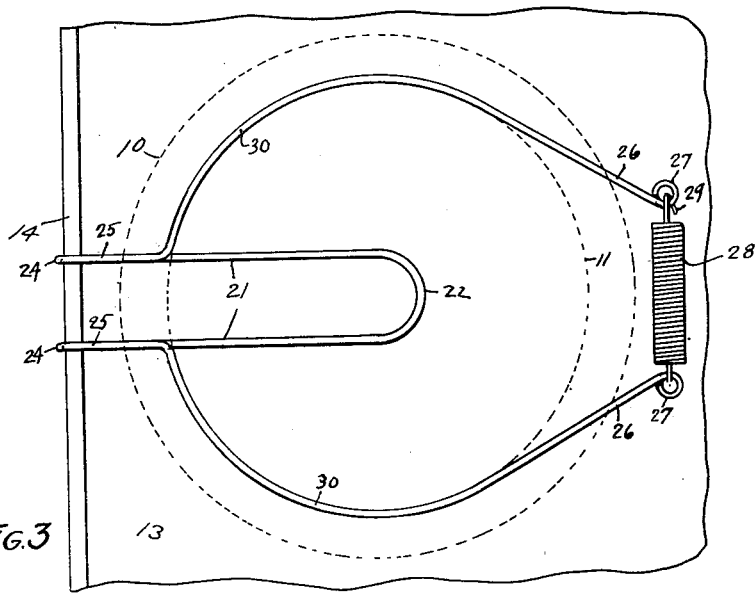
Fig. 3 is a plan of a further modification of the device.
Figure 4:
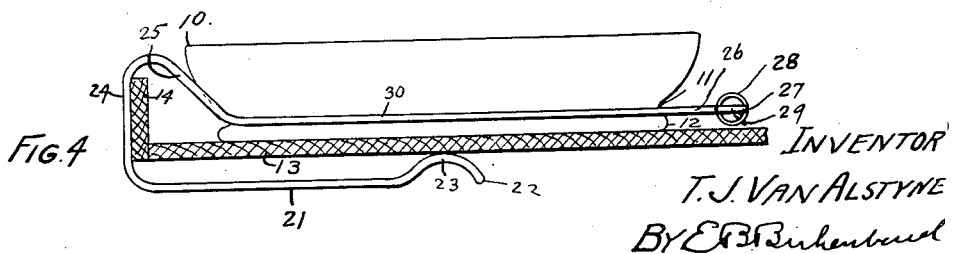
Fig. 4 is a vertical section through a child's high chair tray showing the device and dish mounted thereon.

In Figs. 3 and 4 there is illustrated a holder made entirely of wire consisting of a U-shaped member 21 whose end 22 is convex on its upper side 23 which engages the underside of the tray 13 directly under the center of the dish 10. The sides 24 of the member 21 turn upwardly along the outside of the front edge 14 and then inwardly along the straight portions 25 to the groove 11 which they follow around and then have their ends 26 extend tangentially to the eyes 27 which are urged toward each other by means of the tension spring 28, one end of which is provided with a hook 29 for connecting purposes.

In this form of the device the dish is held in place by spring pressure between the U shaped members 21 and the groove engaging portions 30 which connect the members 25 and 26, and the portions 30 are held in position in the groove 11 by means for the spring 29.

It can be seen from the foregoing that regardless of whether the surface of the table is smooth, this form of the device will securely hold the dish 10 to the supporting tray or table 13 and the child cannot remove the device as long as the fastening spring 29 is in place.

I claim:

In the device of the class described, a U-shaped wire clamp having its closed end adapted to be placed under the tray of a child's high chair and having the open ends of said frame turned upwardly along the inner edge of said tray and then curved to form a circular clamp adapted to occupy the groove of an externally grooved dish, and a spring uniting the ends of said U-shaped clamp in a manner to urge said clamp into said groove.

THOMAS J. VAN ALSTYNE.